(12) United States Patent
Mitchell

(10) Patent No.: US 6,519,774 B2
(45) Date of Patent: Feb. 18, 2003

(54) SCUBA WET SUIT WITH CONSTANT BUOYANCY

(76) Inventor: Joan L. Mitchell, 2400 17$^{th}$ Ave.-Unit103D, Longmont, CO (US) 80503

( * ) Notice: Subject to any disclaimer, the term of this patent is extended or adjusted under 35 U.S.C. 154(b) by 0 days.

(21) Appl. No.: 09/877,106

(22) Filed: Jun. 11, 2001

(65) Prior Publication Data

US 2002/0184690 A1 Dec. 12, 2002

(51) Int. Cl.$^7$ ............................................. B63C 11/04
(52) U.S. Cl. ............................................. 2/2.15; 2/2.16
(58) Field of Search ................................. 2/2.16, 2.1 R

(56) References Cited

U.S. PATENT DOCUMENTS

| | | | |
|---|---|---|---|
| 3,365,315 A | * 1/1968 | Beck et al. | 264/31 |
| 3,660,849 A | * 5/1972 | Jonnes et al. | 2/2.15 |
| 4,083,127 A | 4/1978 | Hanson | |
| 4,181,993 A | * 1/1980 | McDaniel | 441/108 |
| 4,276,341 A | 6/1981 | Tanaka | |
| 4,303,603 A | 12/1981 | Torobin | |
| 4,303,731 A | 12/1981 | Torobin | |
| 4,344,787 A | 8/1982 | Wang et al. | |
| 4,494,246 A | 1/1985 | Tillbrook | |
| 4,547,904 A | 10/1985 | Long et al. | |
| 4,598,106 A | 7/1986 | Utsugi | |
| 4,713,974 A | 12/1987 | Stone | |
| 4,879,321 A | 11/1989 | Laroche | |
| 4,882,785 A | 11/1989 | Long et al. | |
| 5,421,874 A | 6/1995 | Pearce | |
| 5,549,743 A | 8/1996 | Pearce | |
| 5,626,657 A | 5/1997 | Pearce | |
| 5,722,482 A | 3/1998 | Buckley | |
| 5,777,947 A | 7/1998 | Ahuja | |
| 5,960,469 A | 10/1999 | Nuckols et al. | |
| 6,077,597 A | 6/2000 | Pause | |

OTHER PUBLICATIONS

PADI Open Water Diver Manual, International PADI, Inc.; Rancho Margarita, CA; c. 1999, ISBN 1–878663–16X; pp. 14–19, 60–61, 77–78, 83–92.
PADI Rescue Diver Manual; International PADI, Inc.; 1995, ISBN 1–878663–09–7, pp. 98, 136, 137.
PADI Divemaster Manual, 1999, ISBN 1–878663–07–0, pp. 66–69.
The Encylopedia of Recreational Diving; 2nd Edition; PADI, 1996; ISBN 1–878663–02–X; pp. 1–11–3–45.

* cited by examiner

Primary Examiner—John J. Calvert
Assistant Examiner—Robert H. Muromoto, Jr.
(74) Attorney, Agent, or Firm—Whitham, Curtis & Christofferson, P.C.

(57) ABSTRACT

An article of insulation includes a plurality of containers supported by at least one support layer. Each of the containers have rigid walls which enclose either a vacuum or a gas. When in water, the rigid-wall containers provide insulation and buoyancy which makes the insulation ideal for clothing and wet suits. These properties may be enhanced by making the support layer from thermal insulation material and/or one which itself exhibits a desired buoyancy. The containers may be formed as beads which are spherical or non-spherical in shape, or the containers may have a tubular shape. Further, the beads may all be of the same size or the sizes may be varied to achieve desired buoyancy and/or insulation properties. A wet suit made from this insulation outperforms conventional wet suits in terms of insulation, buoyancy, comfort, safety, thinness, and functionality. An article of clothing made from this insulation may be used to keep a wearer afloat until help arrives.

57 Claims, 4 Drawing Sheets

SCUBA WET SUIT WITH CONSTANT BUOYANCY

BACKGROUND OF THE INVENTION

1. Field of the Invention

The invention generally relates to insulating materials and, more particularly, to an insulating material which demonstrates improved resistance to heat conduction especially at lower temperatures within a liquid environment as well as exhibiting selected desirable heat conduction characteristics in a gaseous (e.g. air) environment. More particularly, the present invention also relates, for example, to a scuba wet suit or other articles of clothing which are made from this insulating material and which, when incorporated into the clothing, demonstrates improved buoyancy properties over a wide range of ambient pressure.

2. Description of the Related Art

At the present time, many recreational and occupational activities are carried out in environments which can differ greatly from conditions that would be considered "normal" for most humans and garments and other equipment specific to various activities are known for enhancement of comfort and safety. While a degree of comfort is considered desirable for recreational activities, some provisions are often made to enhance safety. In occupational activities, comfort may be secondary to safety but some enhancements for comfort are generally provided. In practice, however, there is little distinction made between provisions for safety and comfort other than a a matter of severity or varibility of conditions which can be made tolerable and equipment having such provisions are collectively referred to as "protective".

Nevertheless, provisions made for some conditions may not be fully successful and may, in fact, engender some additional safety considerations. Consider, for example, an underwater environment (for either a recreational or occupational activity). It is well-recognized that water will remove heat from (or transfer heat to) a surface about twenty times more rapidly than a gaseous environment at the same temperature due to, among other considerations, enhanced convection effects and greater specific heat. Therefore, a liquid environment may not be comfortable even at temperatures that would be comfortable in air and increased temperature differences may become debilitatingly uncomfortable or dangerous. Moreover, water will usually be somewhat colder than the air above the surface due to evaporative cooling and other effects and temperature will generally decrease with increasing depth. Accordingly, most protective garments adapted for an underwater environment will usually include materials having some insulative qualities even though the materials may have uncomfortable or potentially dangerous qualities above the liquid/water surface.

In the case of a so-called wet suit which has become familiar for use with self-contained underwater breathing apparatus (SCUBA—often used to refer to the suits themselves) a relatively tight-fitting generally waterproof resilient material is used to reduce convection effects in liquid within the wet suit close to the body of the wearer while the waterproof material (generally low density neoprene or the like) is formed with air spaces therein to decrease heat loss through the material. The tight fit and the surface qualities of the material make the wet suit difficult and uncomfortable to put on and, more importantly, in the atmosphere, substantially prevents evaporation of perspiration from the body; a primary temperature regulating mechanism of the human body. Accordingly, aside from the increased discomfort of the wet suit, in general, the human body in a wet suit can easily and quickly become dangerously overheated when in a gaseous rather than liquid environment. (Although the effect may be relatively small, an instability of thermal regulation may also be present since increased temperature of the wet suit material from body heat as well as radiant energy (e.g. sunlight) heating may expand the air spaces and increase the insulative characteristics thereof.) Accidental heat stroke while wearing a wet suit is not uncommon.

The nature of conventional insulation in a wet suit also presents some additional safety concerns and potential dangers as well as presenting substantial costs and inconvenience in use. Specifically, the air spaces formed in the material of the wet suit are compressible while liquids such as water have substantial mass/density and are substantially incompressible. The mass/density of water thereof causes pressure to increase rapidly with depth (e.g. about one atmosphere for each thirty-three feet or by a factor of about five at one hundred thirty feet, the maximum depth considered reasonably safe for recreational use of SCUBA gear). The effect of this increase in pressure is to compress and decrease the volume of air spaces in the wet suit material; decreasing the insulative qualities with increasing liquid depth where reduced liquid/water temperatures are more likely to be encountered. Therefore, a wet suit is very limited, as a function of depth, to provide suitable insulating qualities and comfort for the wearer.

Much more importantly, however, the compressibility of the air spaces in wet suit material cause a significant instability in buoyancy. If a wet suit were to be fabricated which included a total air space volume for neutral buoyancy of a wearer at a depth of, for example, thirty feet, positive buoyancy would be developed at shallower depths while negative buoyancy would be developed at greater depths. Since positive buoyancy causes a tendency to float while negative buoyancy causes a tendency to sink and the change in buoyancy is a function of water pressure and depth, these effects become more pronounced with increased excursion from the neutral buoyancy depth. Moreover, thicker wet suits intended to provide greater insulation for use at greater depths increase the severity of this instability in buoyancy while being less flexible and more limiting of body motion.

In order to counteract this instability in buoyancy, buoyancy correction devices (BCD) are known for prevention of uncontrolled ascent or descent. As a diver descends to greater water depths, the diver may increase inflation of the BCD to counteract loss of buoyancy of the wet suit but must bleed air from the BCD during ascents. However, small errors in control of a BCD by a diver can and often do result in uncontrolled ascents or descents; from which serious injury or even death can result.

Further, in order to limit the severity of changes in buoyancy, a wet suit might be fabricated to be neutrally buoyant at a projected average depth of use; resulting in positive buoyancy for a significant depth below the water surface. Since BCDs are principally intended to increase buoyancy to a substantially neutral level when the air spaces in the wet suit are significantly compressed, a diver must carry a significant amount of weight in order to be able to achieve sufficiently neutral buoyancy at the surface to descend underwater at all. In an emergency it may be necessary to jettison some or all of these weights during ascent. Therefore, the weights must be fabricated to be securely held on the body and yet be readily removable as may be required.

Such problems and safety concerns are not confined to wet suits but are common to other types of diving suits which may, in fact, present additional but related problems. For example, the so-called dry suit, like the wet suit, may also be made of a positively buoyant low-density neoprene which is subject to the same compression characteristics and instability of buoyancy but to a somewhat reduced degree since thinner material is used. The dry suit is not tight-fitting and allows additional insulating garments to be worn. Additional insulation is provided by air inside the dry suit and the additional insulating garments. However, the air within the dry suit is compressible and additional air must be added within the dry suit as depth increases to maintain insulation and resist water incursion into the dry suit which would further reduce the insulation properties of the additional insulating garments. This additional air must be vented during ascent to avoid excess buoyancy. (While BCDs are recommended for use with dry suits, many divers perform buoyancy compensation by adding air to and venting air from the dry suit alone.)

However, the total amount of air even in a fully vented dry suit generally exceeds the amount of air encapsulated in air spaces in a wet suit and the instability of buoyancy is relatively increased. Also, to attain sufficiently neutral buoyancy at the water surface relatively more weights must be worn. Ankle weights are also often necessary and generally worn to avoid air within the dry suit moving to the legs thereof and holding the diver in an inverted position. Further, air cannot be vented from the dry suit in an inverted position and uncontrolled ascents are less avoidable or recoverable in such an event. Since the movement of air to the legs of a dry suit can be initiated from a number of positions of a diver, a substantial additional safety hazard is presented. Similar problems are present to some degree in virtually all known protective garments for underwater use.

In summary, known techniques for providing insulation with a flexible material have involved structures which present an unavoidable instability of buoyancy (as well as some temperature-related hazards when not immersed in liquid) while not being fully successful in limiting heat loss over a range of water depths. Even under circumstances where the insulating material is not immersed to substantial depths and instability of buoyancy is of little or limited importance, the reduction of air volume in most insulating materials radically reduces the insulative properties. For example, goose down and other fibrous and/or high loft materials that are known to be high-quality insulators under normal circumstances have little insulating quality when compressed or wet. Therefore, there has been no alternative to the above-described materials and their undesirable and potentially dangerous effects where submersion was contemplated or the potential loss of insulating properties of other materials under circumstances which may be unavoidable.

SUMMARY OF THE INVENTION

It is a first object of the present invention to provide an insulating material which demonstrates improved resistance to heat loss as temperature descends in a fluid environment.

It is a second object of the present invention to provide an insulating material which, when used in a fluid environment, exhibits improved buoyancy properties especially at increased pressures.

It is another object of the present invention to provide a wet suit made from an insulating material which satisfies the first and second objects, and which therefore keeps a wearer of the suit warmer at diving depths and allows the diver to achieve neutral buoyancy within a range of diving depths with our without using a buoyancy compensation device used by conventional wet suits.

It is another object of the present invention to provide a wet suit which is thinner than conventional wet suits, especially those made from neoprene or other elastic materials which rely on trapped air bubbles for positive buoyancy and which also rely on a buoyancy compensation device for neutral buoyancy at lower diving depths.

It is another object of the present invention to provide a wet suit which is looser fitting, more flexible, and easier to put on and take off than conventional wet suits.

It is another object of the present invention to provide a wet suit which is safer to use, especially by physically and/or mentally handicapped individuals.

It is another object of the present invention to provide an article of clothing made from an insulating material which demonstrates the aforementioned heat conduction properties and, for life-saving purposes, is biased with a positive buoyancy so that individuals wearing the clothing (fisherman, oil platform workers, pilots, surfers, water skiers and other sportsman, etc.) may stay afloat until help arrives.

These and other objects of the present invention are achieved by providing an article of insulation which includes at least one support layer and a plurality of containers supported by the at least one support layer. Each of the containers have rigid walls which enclose either a vacuum or a gas. When in water, the rigid-wall containers provide insulation and buoyancy which makes the insulation ideal for clothing and wet suits, described in the embodiments which follow. These properties may be enhanced by making the support layer from thermal insulation material and/or one which itself exhibits a desired buoyancy. To increase its suitability for clothing and wet suits, the support layer may be made from a flexible, elastic material. The containers may be formed as beads which are spherical or non-spherical in shape, or the containers may have a tubular shape. Further, the beads may all be of the same size or the sizes may be alternated to achieve a desired buoyancy and/or insulation profile.

In accordance with one embodiment, the containers are embedded with in a single support layer. In accordance with another embodiment, the support layers are attached to one another in a quilt pattern. In the quilt pattern, pockets are formed for holding one or more containers. The containers may be left to freely move within the pockets or an absorbent powder may be added which gels when exposed to water.

The present invention is also a wet suit made from the insulation material described above. The wet suit may be entirely made of this insulation material, or the insulation material may be formed on selected portions of the wet suit. The size, number, and arrangement of the containers may be selected to achieve desired buoyancy and insulation properties. For example, the suit may be designed to have positive buoyancy at the surface, or improved neutral buoyancy substantially throughout a wide range of diving depths.

The wet suit of the present invention is able to outperform conventional wet suits in a number of ways. First, the wet suit of the present invention demonstrates improved resistance to heat conduction compared with conventional wet suits. This results from the use of an insulating material with rigid-wall containers which do not compress with water depth. Second, the wet suit of the present invention demonstrates improved buoyancy properties compared with conventional wet suits, also as a result of using non-compressible, rigid-wall containers. Third, the wet suit of the present invention is safer to use than conventional wet suits because the buoyancy provided by the rigid-wall containers. The wet suit of the present invention is also more comfortable to wear than conventional suits.

The present invention is also an article of clothing made from the insulation material described above. This clothing may be in the form of jackets, pants, shirts, vests, and the like. The rigid-wall containers may be made to demonstrate a positive buoyancy, thereby turning the clothing into a safety device when its user falls into the water.

DESCRIPTION OF THE PREFERRED EMBODIMENTS

The present invention is an insulating material which demonstrates improved resistance to heat conduction at reduced temperatures in a fluid environment, and which further exhibits improved buoyancy properties especially as pressure increases in this fluid environment. The present invention is also a wet suit made from an insulating material of this type and which is suitable for scuba diving, snorkeling, rafting, water skiing, surfing, kayaking, boating, and other aquatic activities in both fresh and saltwater. The present invention is also an article of clothing made from insulating material as described above which has a positive buoyancy bias which keeps a wearer afloat should the wearer fall into the water until help arrives. These and other embodiments of the present invention are discussed below in seriatim.

Figure 1:
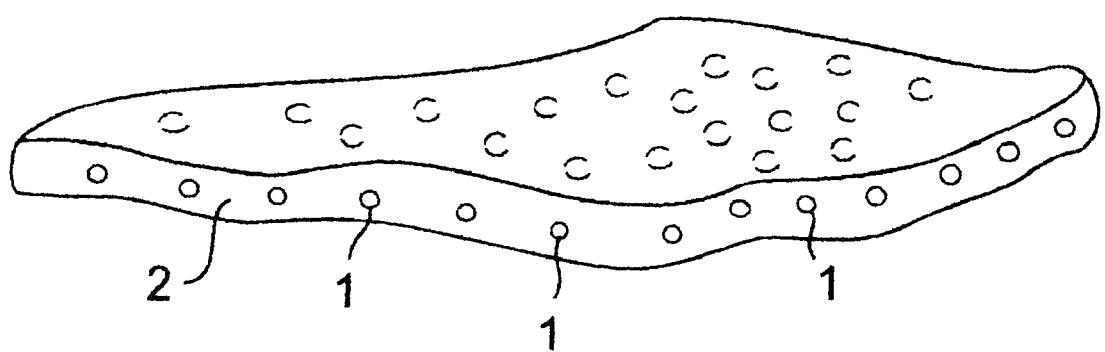
FIG. 1 is a cross-sectional view of an insulating material in accordance with a first embodiment of the present invention.

Referring to FIG. 1, a cross-sectional view of an insulating material in accordance with a first embodiment of the present invention includes a plurality of containers 1 embedded within a support layer 2. The support layer is preferably made of a flexible material which is also elastic. To make the material suitable for use in an aquatic environment, the support layer may be a layer of water-impermeable material such as rubber or neoprene, both of which are commonly used in the fabrication of wet suits and dry suits.

Those skilled in the art can appreciate that the support layer may be made from other materials depending on the intended use. For example, the insulating material may be used to prevent or reduce heat conduction in aqueous solutions in scientific experiments or industrial applications, where low temperatures are involved or where there are large temperature swings. In these circumstances, the support layer may be made from materials selected consistent with these uses and anticipated temperatures and ambient materials. Also, the support layer may be incorporated into a rigid structure (e.g., fiberglass, plastics, composites) used, for example, in boat hulls, docks, or other structure intended to float.

The containers of the present invention are made from rigid walls enclosing an interior space which is filled with a vacuum or a gas or mixture of gases such as air, nitrogen, or helium at any pressure that may be desired or convenient for enhancing structural integrity of the containers. When incorporated into the support layer, the containers not only perform an insulating function, they also provide buoyancy which may prove useful in a variety fluid environments. To enhance the insulating and buoyancy properties of the invention, the rigid walls of the containers are made from a material which is non-compressible up to a predetermined pressure in excess of pressures which are anticipated during use. Like the material used to form the support layer, the maximum pressure to be withstood by the container walls (possibly supported to some degree by gas pressure) may be freely selected to satisfy the specific application of the invention. For example, if the insulating material is intended for use in diving applications, the container walls may be made from a metal, a composite material, or even a high-strength plastic. If a life-saving application is intended, the container walls may be made from softer plastics.

The spacing of the containers in the support layer affects the insulating and buoyancy properties of the invention. The containers may be spaced within the support layer randomly or according to a predetermined pattern, which may be a regular pattern such as in a lattice or close-packed "honeycomb" array. Containers of different sizes may also provide increased density of packing of containers. The containers may be embedded within the support layer in this random or regular pattern using known techniques. For example, containers may be deposited into the support layer when this layer is still in a liquid or partially liquid state. The layer may then be allowed to cool, during which time the containers are permanently incorporated within the support layer. Those skilled in the art can appreciate that other conventional techniques may also be used. If desired, the containers of the present invention may be densely grouped within the support layer to prevent or minimize volume of the spaces between the containers that are susceptible to being filled with fluid. By the same token, the use of such containers allows the option of using fluid permeable material for the support layer allowing natural body temperature regulation through perspiration when not immersed in liquid.

The number or density of containers in the support layer also affects the insulating and buoyancy properties of the invention. This number may be selected based on any one or more of the materials used to form the support layer and containers, the spacing pattern of the containers, the size of the containers, and/or the intended application and desirable buoyancy therefor. For example, if the insulating material of the invention is intended for use in water and the containers are made from metal, then a certain number of containers per square inch would be embedded in the support layer to achieve improved neutral buoyancy. Neutral or a given positive or negative buoyancy will be maintained throughout a large range of depths since both the containers and the liquid (e.g. water) are both substantially incompressible. If intended for a life-saving application and the containers are made from plastic or a composite, a positive buoyancy bias may be achieved using a different number of containers, depending upon the maximum weight tolerance of a wearer.

Figure 2:
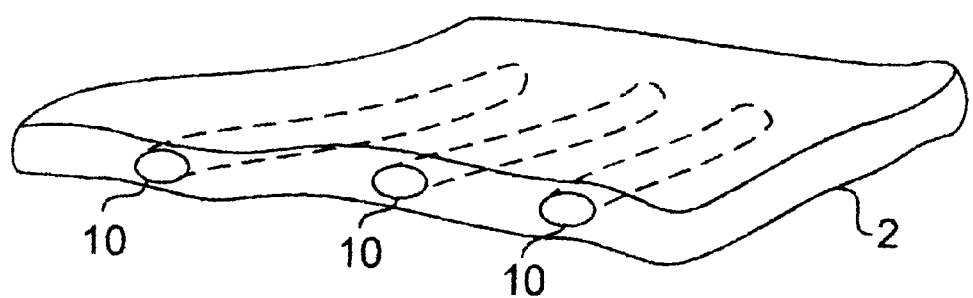
FIG. 2 is a cross-sectional view of an insulating material in accordance with the first embodiment of the present invention equipped with tubular, rigid-wall containers

The shape of the containers may be varied to also fit the intended use. For example, the containers may be beads which are preferably spherical in shape. Alternatively, the beads may be non-spherical taking the shape of boxes, pyramids, or shapes of other geometries, or the containers may have non-uniform or irregular shapes that may be chosen to pack together with a given interstitial volume. The containers may also be in the shape of tubes or strands 10, as shown in FIG. 2. A combination of the aforementioned shapes may be used, if desired. The size of the containers may also be varied. For example, the containers may all be of substantially the same size, or if desired, the containers may be of different sizes as may be dictated by the desired insulating and/or buoyancy requirements and/or desired flexibility.

Figure 3:
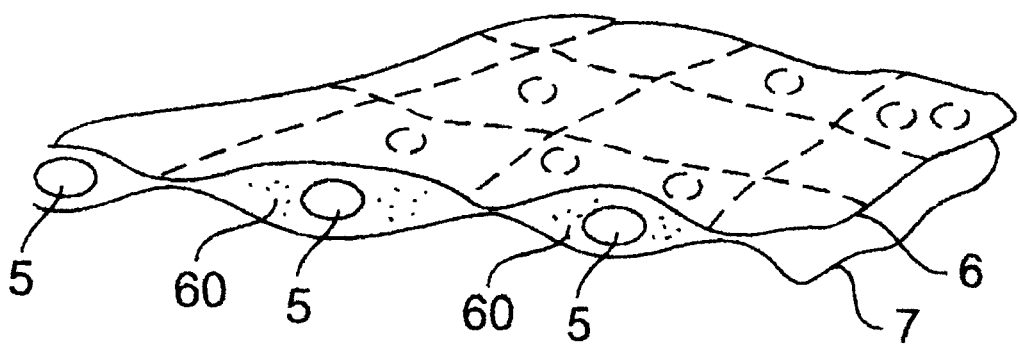
FIG. 3 is a cross-sectional view of an insulating material in accordance with a second embodiment of the present invention.

Referring to FIG. 3, a cross-sectional view of an insulating material in accordance with a second embodiment of the present invention includes a plurality of containers 5 situated between two support layers 6 and 7. Alternatively or in addition, layers 6 and 7 are bonded or otherwise attached (e.g. sewn) together in a quilted pattern which will assist in the containers assuming a desired packing array. The support layers and containers may be formed from any of the materials described above in connection with the first embodiment. To enhance the insulating properties of the invention in both liquid and gaseous environments, the support layers are preferably formed from material used to make Polartec® environmental-protection suits. See, e.g., U.S. Pat. Nos. 5,622,762 and 4,276,341. The support layers may also be made from a material which, in combination with the containers, achieves a desired buoyancy profile, described in greater detail below.

The support layers are preferably joined in a quilt pattern, which includes pockets 8 formed when complementary portions of the support layers are joined. As shown, the containers are held within the pockets of the quilt pattern. Preferably, there are multiple containers per pocket, but single containers per pocket may be used if desired. If there are multiple containers per pocket, the containers may be left to freely move between the support layers. In general, if suitably resilient and, possibly, gas-permeable materials are used for support layers 6 and 7, the containers may be loosely contained in a gas environment, allowing a reduction in insulation properties, but will assume a close-packed arrangement when immersed in liquid. Alternatively, an absorbent powder or other material may be included in each pocket to hold the containers in a gelled matrix within the pocket. The number of containers may be staggered throughout the pockets in predetermined fashion. In the quilt pattern, the seams of the quilt may be made so that no seam goes from the outer-most to the inner-most layer of the wet suit. Also, the seams may be staggered so that no thermally weak spots would be left from punctures or welds.

Optionally, a pattern different from a quilt pattern may be used. As those skilled in the art can appreciate, the pattern used to join the support layers will dictate the spacing and number of the containers. This pattern may be configured to densely pack the containers together so that a minimum amount of water resides in the spaces therebetween.

Figure 4:
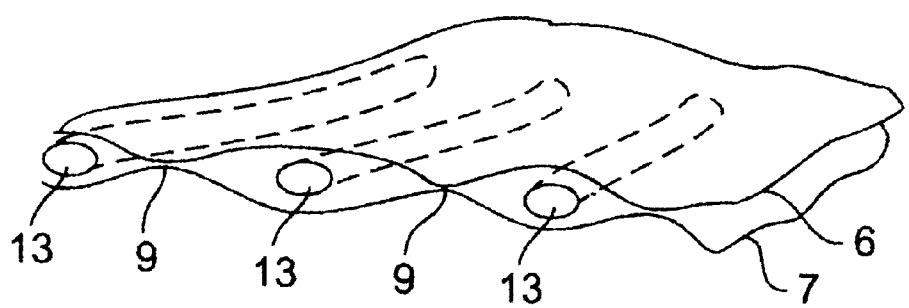
FIG. 4 is a cross-sectional view of an insulating material in accordance with the second embodiment of the present invention equipped with tubular, rigid-wall containers.

The shape of the containers used in this embodiment may be any of those previously discussed. For example, if the containers are in the shape of beads, the quilt pattern may be formed to have alternating small and large beads in its pockets, in order to achieve a desired buoyancy characteristic. Other combinations and sizes of beads may also be contemplated. A two-support layer embodiment using containers 13 in the shape of tubes is shown in FIG. 4. To complete the quilt pattern, the support layers are joined at areas 9 using any of a variety of conventional techniques, including but not limited to stitching, adhesives, welding, and ultrasonic welding.

Figure 5:
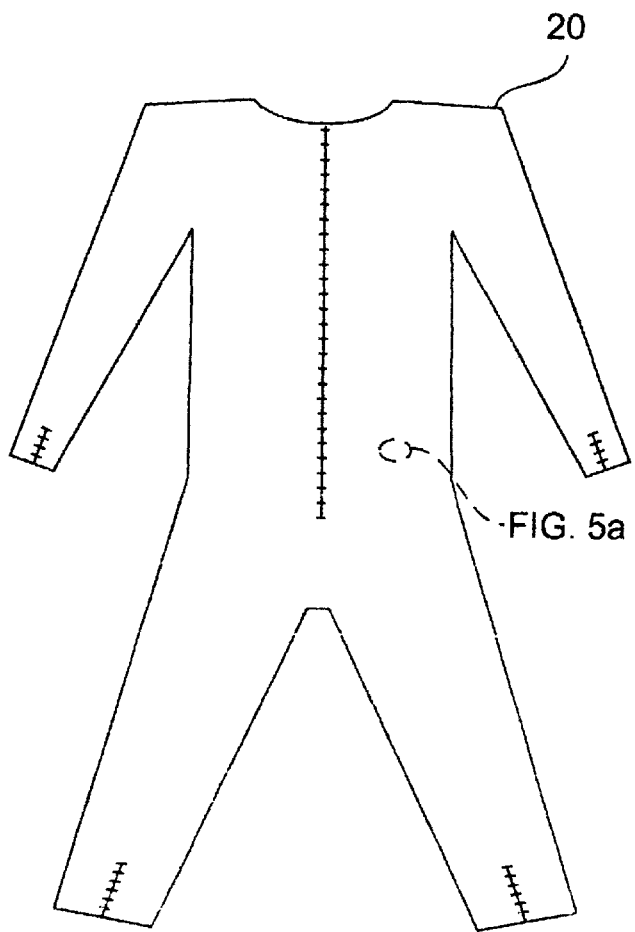
FIG. 5 is a diagram of a wet suit in accordance with the present invention.
Figure 5A:
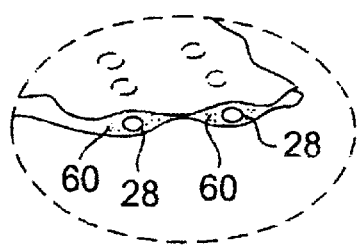
FIG. 5a is an exploded view of one type of insulation material from which the wet suit of the present invention may be made.

Referring to FIG. 5, a preferred embodiment of the wet suit 20 of the present invention is made from any of the insulating materials shown in FIGS. 1–4. This insulating material may be incorporated into the wet suit in a variety of ways. The wet suit, for example, may be made entirely of the insulating material of the present invention, or the insulating material may be formed at selected locations of the suit, e.g., the chest area, back area, and arm areas. If desired, Velcro™ may be used to attach a widely adjustable wet suit to different body shapes. Also, the wet suit may be made from multiple layers of insulating material each containing the rigid-wall containers of the present invention, or a single layer of insulating material may be sandwiched between multiple layers of conventional thermal protection (e.g., Polartec®) material. FIG. 5a shows an exploded view of a cross-section of the wet suit of FIG. 5, wherein the containers are labeled 28.

The wet suit of the present invention is able to outperform conventional wet suits in a number of ways. The first way relates to the insulating properties of the suit. Conventional wet suits are typically constructed from neoprene. During manufacture, air bubbles are intentionally trapped in the neoprene for enhanced insulation. Unlike the present invention, these bubbles are compressible and the extent to which they compress is proportional to dive depth. More specifically, when air bubbles compress to smaller volumes as a result of the increased pressure at descending depths, the ability of the air bubbles to insulate a diver is adversely affected. Studies have shown that pressure on the diver increases by an atmosphere every 33 feet of water depth. At a depth of 130 feet, which is at the extreme of recreational diving, the air bubbles in conventional wet suits therefore compress to one-fifth their original volume. This reduced volume greatly diminishes the ability of the suit to retain heat which, in turn, translates into discomfort to the diver.

The wet suit of the present invention demonstrates improved resistance to heat conduction compared with conventional wet suits. This results from the use of an insulating material with rigid-wall containers which do not compress with water depth. More specifically, the volume of the containers of the present invention are unaffected by water pressure, at least at depths which are commonly used by the typical diver. A maximum depth of most recreational divers is 130 feet, but those skilled in the art can appreciate that much deeper depths are possible if the containers are made of metal. Because the volume of each container does not change with dive depth, the thermal insulation properties of the wet suit remain substantially constant, even at deeper depths where water temperature is lower and heat retention becomes a main concern. The wet suit of the present invention, thus, increases the comfort of the diver and makes for a longer-lasting dive experience.

The wet suit of the present invention also demonstrates improved buoyancy properties compared with conventional wet suits. Conventional wet suits made from neoprene rely on trapped air bubbles in the neoprene to provide insulation to a diver. The air bubbles make the suit positively buoyant at the surface; however, in order to achieve neutral buoyancy more than 20 pounds of lead weights must be added to the diver. Because the air bubbles trapped in the suit compress as a diver descends, the suit actually becomes thinner an d negatively buoyant at deeper depths, both of which pose a significant safety risk. To offset the negative buoyancy, divers wearing conventional wet suits must be equipped with a Buoyancy Compensation Device (BCD) which is cumbersome to use and often limits the mobility of the diver. Also, the decrease in thickness of the wet suit at deeper depths, where the water is colder, diminishes the insulation properties of the suit where the diver need s it the most.

The wet suit of the present invention overcomes all of these drawbacks of conventional wet suits. By using non-compressible, rigid-wall containers, the wet suit of the present invention retains constant buoyancy irrespective of water depth. As a result, neutral buoyancy is achieved with much less added weight and maintained throughout a greater range of depths than conventional wet suits. Also, because the volume of each container does not change, the wet suit of the present invention retains its insulation properties at deeper and colder depths were it is needed most. Still further, the thickness of the wet suit of the invention may be made thinner than conventional wet suits, which are often made very thick to compensate for the reduced volume at lower depths.

The wet suit of the present invention is safer to use than conventional wet suits. For example, at lower depths, the increased pressure compresses the volume of conventional wet suits, causing them to lose buoyancy. To compensate for this loss, air must be bled into the BCD to keep the diver near neutral buoyancy and in control. On ascent, the extra air must be released to prevent a dangerous, out-of-control "elevator" ride to the surface. The risks presented by these control considerations are multiplied for inexperienced divers and divers with physical and/or mental handicaps or which have impaired motor skills. By using rigid-wall containers which retain their volume irrespective of depth, the wet suit of the present invention eliminates the need for a BCD device altogether for skilled divers. Without a BCD, there is no risk of the diver experiencing an elevator ride to the surface and the diver can achieve enhanced control. The suit of the present invention therefore is more suitable for use by inexperienced and handicapped divers and also reduces risks for experienced divers because less air is being added to the BCD if it is used.

The wet suit of the present invention also is more comfortable to wear than conventional suits. By densely spacing the containers in the insulating material, the amount of water absorbed by the suit of the invention may be minimized. This will allow for a looser fitting suit (i.e., the suit need not be skin tight), and moveover one which is easier to put on and take off. Also, since a thermal resistance of only a few millimeters of vacuum or trapped gas in the containers is sufficient for routine recreational diving, the suit does not need to be bulky.

In an alternative embodiment, the wet suit of the present invention may be made so that one section of the suit is positively buoyant and another section is negatively buoyant. This may be achieved, for example, by varying the size of the containers throughtout the suit and/or mixing the containers with lead weights (e.g., shot). In this way the buoyancy of the suit may be tailored to meet virtually any desired profile. For applications in which the diver wants to primarily maneuver in an upright position (e.g., and underwater worker/assembler), the suit may be made so that the leg portions are negatively buoyant and the top portions are positively buoyant. The containers may be fabricated in the manner disclosed, for example, in any one or more of U.S. Pat. Nos. 4,303,603, 4,303,731, 4,713,974, 4,344,787, and 4,879,321.

For those who prefer to swim horizontally and face down, the front of the suit may be made slightly less buoyant than the back. This may significantly help handicapped divers who need assistance in maintaining a swimming position. The instability and variability of buoyancy of known materials has not previously supported such a refinement. A computer scan of a person's physical profile could help design the desired buoyancy profile. One way in which this could be accomplished is to create fabric/material/sheets with different buoyancies. Then, the suit may be constructed by selecting the buoyancy to fit the desired profile. Custom suits may be tailored to whatever is needed to make balancing easiest.

Figure 6:
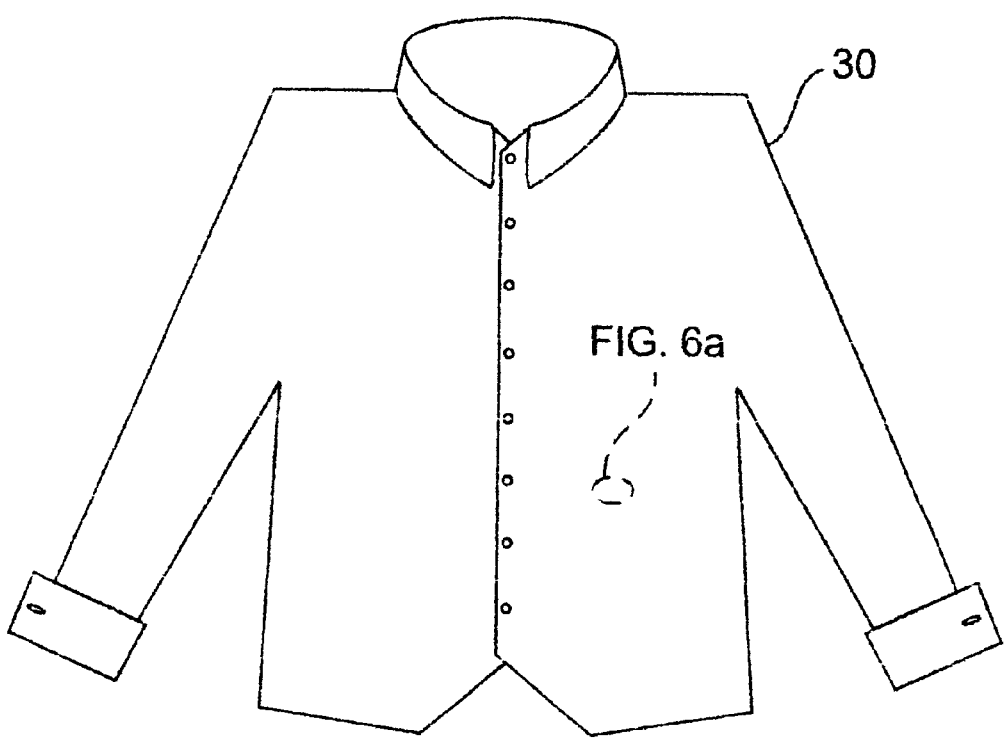
FIG. 6 is a diagram of an article of clothing in accordance with the present invention.
Figure 6A:
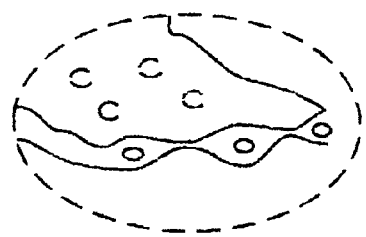
FIG. 6a is an exploded view of one type of insulation material from which the article of clothing of the present invention may be made.

Referring to FIG. 6, a preferred embodiment of an article of clothing 30 of the present invention is made from an insulating material constructed in accordance with any of FIGS. 1–4. Preferably, the rigid-wall containers are positively biased to enable a wearer of the clothing to float on the water surface. The clothing of the present invention is suitable for use as outdoor clothing such as the shirt shown in FIG. 6. Those skilled in the art can appreciate, however, that the invention may be other types of clothing such as jackets, life vests, pants, and children's snow suits just to name a few. The clothing of the present invention may also be a survival suit worn by pilots, fisherman, ocean oil workers, servicemen, and other personnel who may be expected to come into contact with water or other liquids. A cross-section of a shirt containing the insulating material of the present invention is depicted in FIG. 6a, where the containers are labeled using reference numeral 34.

The clothing of the present invention provides the advantage of added insulation to the wearer if the clothing should become wet, e.g., if the wearer falls into the water. If the containers are positively biased, the clothing may further serve as a floatation device. To increase its visibility, the clothing could come equipped with reflective markers or brightly colored paint.

An alternative embodiment of both the wet suit and the clothing of the present invention contemplates adding an absorbent powder (60 in FIGS. 2 and 5a) to the insulating material which swells when it comes into contact with water. In the swelled state, the power would form around and hold the containers in a matrix that serves as a barrier to convection currents which tend to carry away hot water and replace it with cold water, thereby chilling the wearer of the suit. Such a powder may be any conventionally known, such as the type used in baby diapers.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. For example, the tubes of the invention do not have to be round. Instead, they may be hexagonal, rectangular, or any other geometric shape in cross-section. These alternative shapes may prove beneficial because the flattened sides will encourage close packing.

Further, the rigid containers may be embedded in the insulating material, or fleece. If they are attached to each other they will not float away while still allowing the insulating material to trap water which is heated by body heat. The rigid containers may also be trapped in a mesh which keeps them closely packed while still allowing movement of the wearer.

I claim:

1. An article of insulation, comprising:
   at least one support layer; and
   a plurality of containers supported in a densely spaced relationship by said at least one support layer, each of said containers including a rigid wall enclosing an interior space, said rigid wall being of a thickness to provide approximately neutral buoyancy and to maintain substantially constant volume to a pressure corresponding to a depth of at least 130 feet in water.

2. The article of insulation recited in claim 1, wherein said interior space is occupied by a vacuum.

3. The article of insulation recited in claim 1, wherein said interior space is occupied by a gas.

4. The article of insulation recited in claim 3, wherein said gas is one selected from the group consisting of air, nitrogen, and helium.

5. The article of insulation recited in claim 1, wherein said at least one support layer is made from an elastic material.

6. The article of insulation recited in claim 5, wherein said flexible material includes at least one of polyester fleece, microfleece, woven microfiber yarn, polyester microyarn and elastic-backed polyester material.

7. The article of insulation recited in claim 5, wherein said plurality of containers are embedded within said elastic material.

8. The article of insulation recited in claim 1, wherein said at least one support layer includes a first support layer attached to a second support layer in a quilt pattern, said plurality of containers supported in pockets formed between said first support layer and said second support layer within said quilt pattern.

9. The article of insulation recited in claim 8, wherein said first support layer and said second support layer are made from at least one of a flexible and elastic material.

10. The article of insulation recited in claim 1, wherein said plurality of containers are formed as beads.

11. The article of insulation recited in claim 10, wherein said beads are of a same size.

12. The article of insulation recited in claim 10, wherein said beads include beads of a first size and beads of a second size, wherein said second size is smaller than said first size and said at least one support layer supports said first-size beads and said second-size beads in an alternating pattern.

13. The article of insulation recited in claim 10, wherein said beads are spherical in shape.

14. The article of insulation recited in claim 10, wherein said beads have a non-spherical shape.

15. The article of insulation recited in claim 1, wherein said plurality of containers are tube-shaped.

16. The article of insulation recited in claim 1, wherein said at least one support layer is incorporated into one of an article of clothing and a wet suit.

17. A wet suit, comprising:
    an insulation layer; and
    a plurality of containers supported in a densely spaced relationship within said insulation layer, each of said containers having a rigid wall enclosing an interior space, said rigid wall being of a thickness to provide approximately neutral buoyancy and to maintain substantially constant volume to a pressure corresponding to a depth of at least 130 feet in water.

18. The wet suit recited in claim 17, wherein said interior space is occupied by a vacuum.

19. The wet suit recited in claim 17, wherein said interior space is occupied by a gas.

20. The wet suit recited in claim 19, wherein said gas is one selected from the group consisting of air, nitrogen, and helium.

21. The wet suit recited in claim 17, wherein said plurality of containers corresponds to a number which produces a positive buoyancy bias sufficient to keep a wearer floating on the surface of water.

22. The wet suit received in claim 17, wherein said plurality of containers corresponds to a number which produces neutral buoyancy at a predetermined diving depth.

23. The wet suit recited in claim 17, wherein said insulation layer is an elastic material, and wherein said plurality of containers are embedded within said elastic material.

24. The wet suit recited in claim 23, wherein said elastic material is one of rubber and neoprene.

25. The wet suit recited in claim 17, wherein said insulation layer includes a first support layer attached to a second support layer in a quilt pattern, said plurality of containers supported in pockets formed between said first support layer and said second support layer within said quilt pattern.

26. The wet suit recited in claim 17, wherein said insulation layer includes at least one of polyester fleece, microfleece, woven microfiber yarn, polyester microyarn and elastic-backed polyester material.

27. The wet suit recited in claim 17, wherein said plurality of containers are formed as beads.

28. The wet suit recited in claim 27, wherein said beads are of a same size.

29. The wet suit recited in claim 27, wherein said beads include beads of a first size and beads of a second size, wherein said second size is smaller than said first size and said insulation layer supports said first-size beads and said second-size beads in an alternating pattern.

30. The wet suit recited in claim 27, wherein said beads are spherical in shape.

31. The wet suit recited in claim 27, wherein said beads have a non-spherical shape.

32. The wet suit recited in claim 27, wherein said plurality of containers are tube-shaped.

33. An article of clothing, comprising:
    an insulation layer; and
    a plurality of containers supported in a densely spaced relationship within said insulation layer, each of said containers having a rigid wall enclosing an interior space, said rigid wall being of a thickness to provide approximately neutral buoyancy and to maintain substantially constant volume to a pressure corresponding to a depth of approximately 130 feet in water.

34. The article of clothing recited in claim 33, wherein said interior space is occupied by a vacuum.

35. The article of clothing recited in claim 33, wherein said interior space is occupied by a gas.

36. The article of clothing recited in claim 35, wherein said gas is one selected from the group consisting of air, nitrogen, and helium.

37. The article of clothing recited in claim 33, wherein said insulation layer is an elastic material, and wherein said plurality of containers are embedded within said elastic material.

38. The article of clothing recited in claim 37, wherein said elastic material is one of rubber and neoprene.

39. The article of clothing recited in claim 33, wherein said insulation layer includes a first support layer attached to a second support layer in a quilt pattern, said plurality of containers supported in pockets formed between said first support layer and said second support layer within said quilt pattern.

40. The article of clothing recited in claim 33, wherein said insulation layer includes at least one of polyester fleece, microfleece, woven microfiber yarn, polyester microyarn and elastic-backed polyester material.

41. The article of clothing recited in claim 33, wherein said plurality of containers are formed as beads.

42. The article of clothing recited in claim 41, wherein said beads are of a same size.

43. The article of clothing recited in claim 41, wherein said beads include beads of a first size and beads of a second size, wherein said second size is smaller than said first size and said insulation layer supports said first-size beads and said second-size beads in an alternating pattern.

44. The article of clothing recited in claim 41, wherein said beads are spherical in shape.

45. The article of clothing recited in claim 41, wherein said beads have a non-spherical shape.

46. The article of clothing recited in claim 41, wherein said plurality of containers are tube-shaped.

47. The article of clothing recited in claim 33, wherein said plurality of containers corresponds to a number which produces a positive buoyancy bias sufficient to keep a wearer floating on the surface of water.

48. The wet suit recited in claim 25, further comprising:

an absorbant powder between said first support layer and said second support layer, said powder swelling on contact with water to form a barrier to convection currents.

49. The wet suit recited in claim 25, wherein selected portions of said insulation layer have different buoyancies.

50. The wet suit recited in claim 49, wherein one portion of said insulation layer has positive buoyancy and another portion of said insulation layer has negative buoyancy.

51. The article of clothing recited in claim 39, further comprising:

an absorbant powder between said first support layer and said second support layer, said powder swelling on contact with water to form a barrier to convection currents.

52. The article of insulation as recited in claim 1, wherein said containers assume a close-packed arrangement having a given interstitial volume when immersed in water.

53. The wet suit as recited in claim 17 wherein said containers assume a close-packed arrangement having a given interstitial volume when immersed in water.

54. The article of insulation as recited in claim 33, wherein said containers assume a close-packed arrangement having a given interstitial volume when immersed in water.

55. The article of insulation as recited in claim 1, wherein said at least one support layer is fluid permeable.

56. The wet suit as recited in claim 17 wherein said insulation layer is fluid permeable.

57. The article of clothing as recited in claim 33, wherein said insulation layer is fluid permeable.

* * * * *